United States Patent [19]

Briggs

[11] Patent Number: 4,819,076
[45] Date of Patent: Apr. 4, 1989

[54] DUAL-CAMERA PHOTOGRAPHIC SYSTEM

[76] Inventor: John A. Briggs, 325 Water St., Springfield, Oreg. 97477

[21] Appl. No.: 85,939

[22] Filed: Aug. 14, 1987

[51] Int. Cl.$^4$ ............................................. H04N 5/30
[52] U.S. Cl. ................................... 358/229; 358/209
[58] Field of Search ............... 358/209, 225, 909, 224, 358/229, 76, 88; 352/57

[56] References Cited

U.S. PATENT DOCUMENTS

| | | | |
|---|---|---|---|
| 4,030,114 | 6/1977 | Telfer | 354/81 |
| 4,072,973 | 2/1978 | Mayo | 354/290 |
| 4,148,072 | 4/1979 | Vockenhuber | 358/224 |
| 4,418,993 | 12/1983 | Lipton | 352/57 |
| 4,714,962 | 12/1987 | Levine | 358/76 |
| 4,716,470 | 12/1987 | Levine | 358/909 |
| 4,738,526 | 4/1988 | Larish | 354/412 |

Primary Examiner—Jin F. Ng
Assistant Examiner—Stephen Brinich
Attorney, Agent, or Firm—Kolisch, Hartwell & Dickinson

[57] ABSTRACT

A photographic system designed to simultaneously take video and still portraits of a subject is disclosed. The system includes a video camera for real time display, on a cathode ray tube, of an image of the subject to be photographed. It also includes a still camera for taking a photograph of the subject. Each of the cameras normally includes a zoom feature, and apparatus is provided for interconnecting the zoom features so that the cameras zoom at the same rate. The two cameras are normally associated with or positioned in a toy animal so that the subject will be entertained during the photographic process and will not tend to be frightened or intimidated by a strange or unfamiliar camera apparatus.

22 Claims, 2 Drawing Sheets

DUAL-CAMERA PHOTOGRAPHIC SYSTEM

BACKGROUND OF THE INVENTION

This invention relates generally to a photographic system, and more particularly to a photographic system designed to simultaneously take video and still portraits.

Various systems have been developed over the years to maximize the quality of portraits and minimize the time, effort and expense necessary to achieve quality portraits. Some such systems incorporate a reflective surface so that either the photographer or the subject can see what the portrait will look like in advance of being taken. However, such reflective surfaces often create distortion and do not frame the subject in a fashion which is identical to that of the photograph, so the usefulness is limited. Also, such systems have not proven to be overly beneficial when used in the photography of children, who have a tendency to be distracted and irritated by the posing process. This distraction often causes the sitting to take longer than is necessary for the photographer to come up with a suitable end product. Even when the children are being attentive, the resulting portraits are less than candid and often appear stilted and artificial.

Photographic sessions may also take longer than is necessary because of the repositioning and refocusing that must go on. For each subject or subjects, the photographer must either reposition the camera at an appropriate distance from the subject, or refocus the camera based upon that distance, or, in the case of some systems, do both. If additional proofs are to include a larger area surrounding the subjects, the camera is often moved and focusing is repeated. Automatic focus systems have been incorporated in some recent camera designs, but those systems are of limited utility due to various design deficiencies. Also, although the camera may be repositioned, the lighting usually remains static, thus reducing the quality of the portrait.

In some studios, to keep sitting time to a minimum, no movement of the subject is possible. This not only limits the variety of the proofs, but makes it necessary for the child to remain virtually motionless for the entire process. This often results in discontent if not outright rebellion.

The parent or other person purchasing photographs has little choice but to accept the results of the predetermined pose or poses established by the photographer. The photographer has to guess as to the parent's tastes, and then typically takes at least several proofs from which the parent can choose. Unfortunately, because discretion must be exercised by the photographer in positioning the subject, selecting the appropriate photograph composition, and taking the photograph at the precise moment that the child is looking in the right direction and has a pleasant facial expression, a great deal of photographic skill is required. This skill requirement tends to increase the per unit cost of the resulting photographs.

Another problem with conventional portrait systems is that it often is not possible to tilt the camera along a vertical axis, or turn it from side to side, without intricate manual adjustment and locking procedures. Such readjustment of the position of the camera may also require corresponding manual adjustment of the lighting For that reason, photographs fit a predetermined format rather than being versatile enough to capture the spontaneity of the subject Another limitation in present portrait photographic systems is that there is no capability to simultaneously produce a high quality, low cost video of the children whose portraits are being taken. This is somewhat surprising, in view of the popularity of VCRs.

One photographic system, marketed by PhotoControl Systems Corp. of Minneapolis, Minn., and licensed to Sears, includes a video feature usable in a portrait-taking process. That system includes a single lens reflex camera which is used to photograph the image of the subject. That same image is lifted off the optical screen of the camera by a sanction tube, using a mirror array. The image is then electronically translated into a signal which can be displayed on a video monitor. This system enables the photographer and the subject to get a general idea of the appearance of the pose. However, the quality of the video image is badly degraded as it passes through the system, thus providing no incentive to record the video image to provide the subject with both a still portrait and a video product. It does not independently provide a direct video image as well as a still camera image. Also, the vertical format of the PhotoControl system precludes using the video on a TV screen, which normally has a longer horizontal dimension.

The following patents address one or more of the aforementioned problems, but nonetheless are lacking in several serious respects: Bonatsos, U.S. Pat. Nos. 3,398,664; Mayo, 4,072,973; Telfer, 4,030,114; Seki, et al., 4,592,633; and Akisada, et al., 4,566,767.

It is therefore an object of the present invention to develop a system for taking portraits and videos which overcomes the drawbacks and limitations of the prior art proposals. More specifically, the invention has as its objects the following: (1) to develop a system for simultaneously taking high quality video and still portraits of children, which system entertains the child during the sitting process; (2) to provide a camera system which permits the photographer and any other person, such as the subject or the parent of the subject, to view the precise composition of the photograph to be taken; (3) to develop a camera system which provides both a direct video image and a still camera image; (4) to provide a system which permits the parent to actually make the decisions as to precisely which photograph is taken; (5) the provision of a portrait photographic system which includes a zoom feature to enable the photographer to vary the composition without moving either the camera or the subject; (6) to provide a photographic system which permits the camera to be automatically moved to a wide variety of different positions without necessitating a change in lighting; (7) the provision of a portrait and video photographic system which may be used by one having little skill or experience in photography; and (8) to develop a video and still portrait photographic system which accomplishes many of the above objects while utilizing largely conventional cameras, and which thereby permits the system to be relatively low in initial cost and operating expense.

SUMMARY OF THE INVENTION

The present invention accomplishes the above objects by providing a photographic system which may be used to take portraits and which includes both a video camera and a still camera working in concert. The video camera provides real time display on at least one cathode ray tube of an image of the subject to be photographed by the still camera. The cameras each typically include a zoom feature, with means interconnecting the zoom features so that the cameras zoom at the same rate. With this arrangement, the zoom can be automatically controlled, and the cathode ray tube will always display a view which corresponds to the image being photographed.

The cameras are normally associated with an enlarged toy, such as a stuffed animal, so that children will be entertained while their photograph is being taken, and will tend not to be frightened by a strange or unfamiliar camera apparatus, thereby resulting in a far superior product than is normally possible. The use of the CRT to enable both the photographer and the subject or the subject's parent to view the composition of the photograph improves the quality of all of the proofs and reduces the amount of time required to take them, therefore resulting in lower cost and greater customer satisfaction.

Other features and advantages of the present invention will become apparent as this description continues.

DETAILED DESCRIPTION OF THE PREFERRED EMBODIMENT

Figure 2:
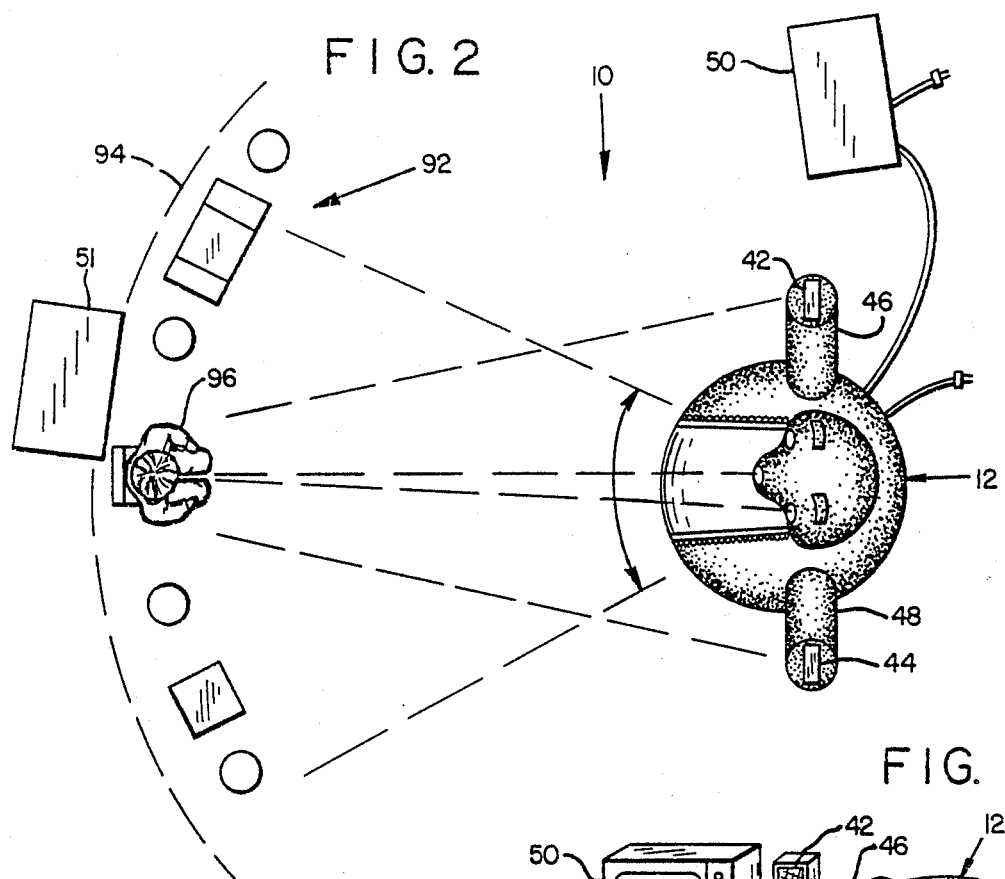
FIG. 2 is a top plan view of the embodiment of FIG. 1, also showing the arcuate studio sitting area.
Figure 1:
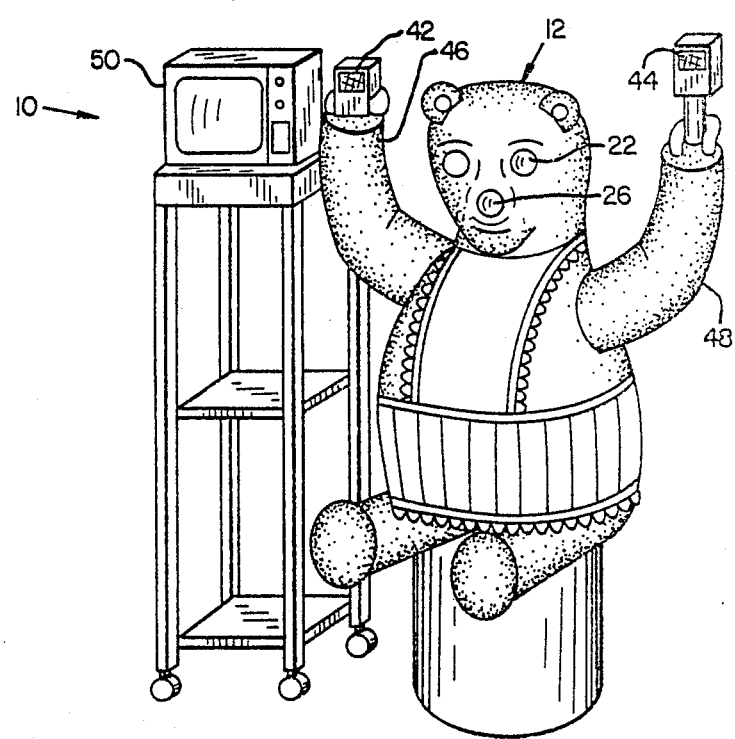
FIG. 1 is a perspective view of a toy bear in which a preferred embodiment of the present invention is disposed.
Figure 3:
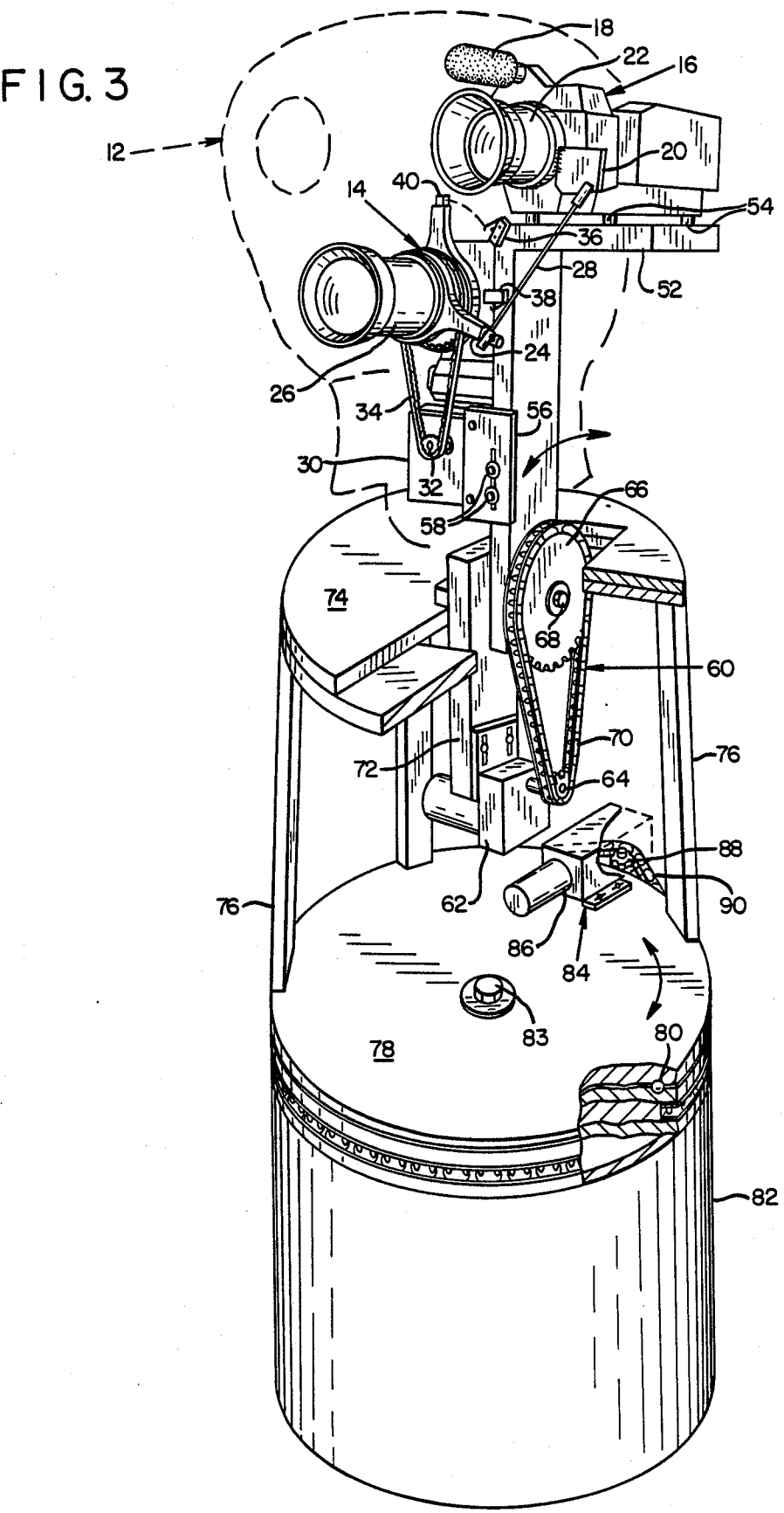
FIG. 3 is a partially broken-away, perspective view of the internal features of the embodiment of FIGS. 1 and 2.

The objects of the present invention are achieved by the dual-camera photographic system depicted in FIGS. 1-3 and generally identified with the numeral 10. The system includes an enlarged toy such as a stuffed bear 12, in which a 35 mm still camera 14 and a video camera 16 are mounted. These cameras are largely of conventional design Each includes a zoom feature, with automatic focus typically using infrared technology. Video camera 16 is shown to include a microphone 18, but this is not an essential feature Two suitable cameras are marketed by Minolta, with still camera 14 preferably being the Minolta Maxxum 7000.

In the embodiment depicted in FIGS. 1-3, video camera 16 looks through one eye of the bear 12, with still camera 14 looking through the mouth. It may be desirable in certain applications to reverse these positions, or to position the cameras looking through the eyes or any other portion of the bear 12 or other animal, toy or imaginary setting in which the cameras are positioned.

Zoom features such as those included in cameras 14 and 16 typically are manually operable by rotating the lens thereof. To facilitate automatic adjustment of the zoom features, a tag 20 is mounted to and extends outwardly from the lens 22 of video camera 16, and a control arm 24 extends outwardly from the lens 26 of still camera 14. Tag 20 and control arm 24 are interconnected by a link arm 28 so that movement of the zoom feature of one of the cameras will result in a corresponding movement of the zoom feature of the other camera.

A zoom control motor 30 is positioned below still camera 14 and may be operated by the photographer to control the zoom of the two cameras 14 and 16. The zoom control motor 30 includes a drive pinion 32 which is interconnected with the zoom control on lens 26 of still camera 14 by a belt 34. Thus, by using a single control for zoom control motor 30, the photographer can control the zoom features of the two cameras simultaneously. The length and radial position of link arm 28 with respect to the two camera lenses is such that movement of the link arm will cause the zoom control to be changed in the two cameras at precisely the same rate. A pair of limit switches 36 and 38 are positioned adjacent still camera 14 to provide limits to the amount of rotation of that camera's zoom. Thus, when lens 26 of still camera 14 has rotated all of the way in a counterclockwise direction looking at the front of the camera, the remote end of control arm 24 comes into contact with limit switch 38 to immediately stop the rotation When the zoom mechanism has rotated as far as desirable in the clockwise direction, a stop arm 40, which extends outwardly from lens 26 of still camera 14, comes into contact with limit switch 36 to stop further rotation.

FIGS. 1 and 2 show that a pair of strobe lights 42 and 44 are held by arms 46 and 48 of bear 12. Strobe lights 42 and 44 are positioned in this manner so that when the torso of bear 12 rotates in one direction or the other, the strobe lights will rotate to the same extent so that they normally need not be adjusted despite such movement Regardless of the setting or type of animal which is utilized, it is typical that the lights will rotate with the rotation of the camera.

System 10 also typically includes a pair of cathode ray tubes or television monitors 50 and 51 which are interconnected with video camera 16. The monitors 50 and 51 may be positioned as desired by the photographer. Normally, they are set so that the subject can see one of the monitors, as shown at 50 in FIG. 1. The other monitor 51 is typically positioned behind the subject so that the photographer can see the video display while looking toward the subject, although the described system also permits the photographer to view monitor 50. This permits him to move around the studio to an extent not previously possible.

A helpful feature of the preferred embodiment is that the composition or framing of the image shown in monitors 50 and 51 will correspond precisely to that which will appear in the resulting photograph taken through still camera 14. Thus, there is less guesswork involved, and proofs of far higher quality are possible. Also, this arrangement actually permits the parent of the subject to actuate the shutter mechanism at precisely the moment they desire.

As depicted best in FIG. 3, cameras 14 and 16 are fixed to an L-shaped camera mounting pedestal 52, the configuration of which is designed to permit the two cameras to be mounted with little alteration to the camera casings other than a few mountings such as those shown at 54. Zoom control motor 30 is mounted to the vertical portion of camera mounting pedestal 52 by an adjustable mounting plate 56 which includes a pair of mounting bolts 58. By loosening these bolts 58, the photographer can adjust zoom control motor 30 upwardly and downwardly to control the tension of the zoom control belt 34.

As mentioned above, a feature of the preferred embodiments of the present invention is a means for providing camera system 10 with the ability to readily be adjusted into a wide variety of different positions. One structure which implements this feature is shown in FIG. 3. A means for providing vertical pivotal control has been generally indicated at 60. Means 60 includes a drive motor 62 having a drive pinion 64 extending therefrom and a drive sprocket 66 which is mounted to a vertical pivotal axle 68 and is interconnected with drive pinion 64 by a belt 70. Axle 68 provides a pivotal mounting between the vertical portion of camera mounting pedestal 52 and a vertically extending mounting post 72 which extends downwardly from a generally horizontal upper support surface 74. Four support columns 76, only three of which appear in FIG. 3, extend downwardly from upper support surface 74 to a lower support surface 78. Lower support surface 78 is rotationally mounted such as by ball bearings 80 to a stationary base 82. This rotational mounting permits the entire portion of the bear 12 disposed above base 82 to be rotated from side to side along a centrally disposed vertically extending axis 83. Means for controlling such rotational displacement is generally indicated at 84. This means 84 includes a drive motor 86 having a drive pinion 88 extending therefrom, which meshes with a chain drive 90 mounted to base 82.

FIG. 2 depicts a portion of a studio 92 which is preferably incorporated in system 10. This studio 92 includes a circular sitting area which extends along a circle, such as that indicated schematically at 94, having a center which corresponds to the position of still camera 14. Therefore, the subject 96 may be seated anywhere in the studio 92 and will still be positioned the same distance from the still camera. This minimizes refocusing as the subject moves within the studio, or as additional subjects enter the studio.

OPERATION OF THE DEPICTED EMBODIMENT

To use system 10, the subject 96 will be asked to sit somewhere in the studio 92. Once the subject 96 has taken position, the automatic focusing feature of the still and video cameras 14 and 16 automatically focus on the subject. However, focusing is normally not necessary because the distance between the bear 12 and the seats within studio 92 is normally fixed. This feature does, however, permit additional subjects to enter the studio, or for the subject to move from side to side within the studio without having to refocus as the bear 12 rotates from side to side to best capture the subjects. This rotational positioning of the bear is possible by the means for controlling rotational displacement 84 which rotates the entire upper torso of the bear with respect to the stationary base 82.

The photographer can look through still camera 14 to view the composition which will appear in the final photograph, and can also look at the monitor 51. As mentioned above, the image in monitor 51 will correspond precisely to that which will appear in the final photograph. The presence of monitor 51 also enables the subject's parent to view the composition of the image being photographed, which will permit the parent to comment to the photographer on the preferred composition. The image on monitor 50 will also serve to entertain the subject. Of course, the presence of an enlarged bear moving from side to side in front of the subject already has the subject in an entertained state of mind. If the subject is disturbed, a preferred feature of the invention permits the image to be either blacked-out from monitor 50, or will permit the substitution of a pleasant scene, a cartoon or some other image which could calm the subject.

The means for vertical pivotal control 60 also permits the upper portion of bear 12 to pivot upwardly and downwardly to best capture the subject. This is an important feature because the height of subjects varies so widely. Also, seats within studio 92 will typically position the subjects at different heights, so that such vertical pivotal control expedites the sitting process. Because the arms 46 and 48 of bear 12 extend from the upper torso, they will also rotate from side to side and in the vertical plane at the same rate that the cameras 14 and 16 are displaced. Thus, the lighting typically does not need to be adjusted despite changes in positions of the cameras.

Video camera 16 in system 10 also permits a video tape to be made of the entire sitting session The microphone 18 within video camera 16 provides the option of including sound in such a video tape. Thus, the photographer has this additional product to sell the customer, thus further maximizing the profit for the system. Also, the subject can be brought in from year to year to produce a composite video product In any event, whether or not a video is purchased along with the photographs, photographs will tend to be superior in quality because the proofs will be of higher quality and will be far more candid than conventional poses. Moreover, because the system is so simple, it may be operated by one having little skill in the photographic arts, thus further reducing the cost, or increasing the profit to the operator.

It should be understood that changes and modifications of the preferred embodiment described herein will be apparent to those skilled in the art. Such changes and modifications can be made without departing from the spirit and scope of the present invention and without diminishing its attendant advantages. It is, therefore, intended that such changes and modifications be covered by the following claims.

It is claimed and desired to secure by Letters Patent:

1. A photographic system for producing two images of a subject, wherein both images are suitable as final products, said system comprising:
    a video camera for producing a first, final-product-quality image in real time display on a first cathode ray tube of an image of the subject to be photographed;
    a still camera for producing a second final-product-quality image of the subject in the form of a photograph, said cameras each including a lens with a zoom feature;
    means for mechanically interconnecting said zoom feature of said cameras so that said lenses zoom at the same rate; and
    single motor means associated with said interconnecting means for simultaneously changing the respective positions of said zoom features.

2. The system of claim 1, wherein the photograph taken by said still camera corresponds to the image displayed on the first cathode ray tube.

3. The system of claim 1, further comprising an enlarged toy-like housing for enclosing both of said cameras therein, said housing being constructed with at least two openings for exposing an outer surface of said cameras' lenses, thereby allowing said camera to be zoomed and focused on the subject.

4. The system of claim 2, wherein said system includes a housing in which said cameras are disposed, and said housing comprises a toy animal.

5. The system of claim 1, wherein said means for interconnecting said zoom features comprises a link arm extending between said cameras.

6. The system of claim 5, further comprising means for remotely controlling said zoom features of said cameras.

7. The system of claim 4, wherein said cameras are disposed in a head of the animal having said cameras' lenses positioned adjacent openings therein, and further comprising means for tilting the head forwardly and rearwardly to vary the image to be photographed.

8. The system of claim 7, further comprising means for turning an upper portion of the animal including the head from side to side.

9. The system of claim 7, further comprising means for automatically tilting and turning at least the head of said animal.

10. The system of claim 8, further comprising a studio seating area for the subject which is defined along a portion of a circle having a center substantially corresponding with said still camera so that the subject will remain in focus regardless of the position in the seating area.

11. The system of claim 8, wherein said upper portion of said animal includes a pair of outwardly extending arms, and lighting means mounted to at least one of said arms.

12. The system of claim 1, further comprising a studio seating area for the subject which is defined along a portion of a circle having a center substantially corresponding with said still camera so that the subject will remain in focus regardless of the position in the seating area.

13. The system of claim 1, further comprising means for simultaneously taking portraits and videos of the subject.

14. The system of claim 1, wherein the first final-product-quality image is in the form of a video tape.

15. The system of claim 14, wherein said video camera has connected thereto a sound-recording device for producing a sound recording of the subject, said sound recording being disposed on the video tape.

16. A photographic system for taking portraits of a subject, comprising:
   a video camera for real time display on a first cathode ray tube of an image of the subject to be photographed;
   a still camera for taking a photograph of the subject to produce an image corresponding to the image displayed on the cathode ray tube, said cameras each including a lens with a zoom feature; and
   an enlarged-toy-like housing for enclosing both of said cameras therein, said housing being constructed with at least, tow openings for exposing an outer surface of said cameras' lenses, thereby allowing said lenses to be zoomed and focused on the subject.

17. The system of claim 16, further comprising the first cathode ray tube.

18. The system of claim 17, further comprising a second cathode ray tube, wherein the first said tube is disposed to be viewed by one who is operating the system, and the second said tube is disposed to be viewed by the subject whose portrait is being taken.

19. A photographic system for simultaneously taking still portraits and video recordings of a subject, wherein both images are suitable as final products for viewing by the subject and others, said system comprising:
   a video camera for producing a final-product-quality video image of the subject, said video camera including lens with a zoom feature for changing a field-of-view;
   at least one video monitor for real time display of the image of the subject being taken by the video camera;
   means for interconnecting said video camera and said video monitor to convey the image from said camera to said monitor;
   a still camera for producing a final-product-quality photograph of the subject, said still camera including a lens with a zoom feature for changing a field-of-view; and
   means for mechanically interconnecting said zoom features so that a change in the field of view of one of said zoom feature will result in a corresponding change in the other, wherein said means for mechanically interconnecting includes a tag operably mounted on the zoom feature of the video camera and a control arm operably mounted on the zoom feature of the still camera, said tag and said control arm being joined by a link arm for simultaneously changing the field-of-view of the zoom features of both lenses.

20. The photographic system of claim 19, further comprising video recording means for recording the image on said video monitor.

21. A photographic system for producing two images of a subject, wherein both images are suitable as final products, said system comprising:
   a video camera for producing a first, final-product quality image in real time display on a first cathode ray tube of an image of the subject to be photographed;
   a still camera for producing a second final-product-quality image of the subject in the form of a photograph, said cameras each including a lens with a zoom feature; and
   means for interconnecting said zoom feature of said cameras so that said lenses zoom at the same rate;
   said cameras being disposed in a toy animal, with said camera lenses positioned adjacent openings, in said animal.

22. The system of claim 21, wherein said camera lenses are disposed in the head of said toy animal, and further comprising means for tilting the head forwardly and rearwardly to vary the image to be photographed.

* * * * *